United States Patent Office 3,105,859
Patented Oct. 1, 1963

3,105,859
PROCESS FOR HYDROISOMERIZATION OF PARAFFINS
Merald C. Fogle, Fox Chapel Borough, Richard G. Goldthwait, Penn Hills Township, Allegheny County, Stanley J. Kwolek, New Kensington, and Theodore Rice, Penn Hills Township, Allegheny County, Pa., assignors to Gulf Research & Development Company, Pittsburgh, Pa., a corporation of Delaware
No Drawing. Filed May 18, 1960, Ser. No. 29,790
5 Claims. (Cl. 260—683.68)

This invention relates to hydroisomerization of aliphatic paraffins and more particularly to an improvement in the isomerization of $C_4$ to $C_7$ aliphatic paraffins in the presence of hydrogen and a platinum-type isomerization catalyst while adding halogen to the reaction zone.

The isomerization of aliphatic paraffins is an important procedure in the petroleum and chemical industries. For example, it is important in the petroleum industry for converting straight-chain paraffins or singly branched paraffins to their more highly branched isomers of higher octane rating. It is known to isomerize paraffins in the presence of hydrogen and platinum-type catalysts. According to one known procedure the isomerization is carried out under reaction conditions similar to those used in catalytic reforming, including low liquid-hourly space velocities and high hydrogen concentrations. A recently developed process for hydroisomerization of aliphatic paraffins obtains high space-time-yield of isomer product by the use of a novel combination of conditions including low hydrogen concentratiaon and high space velocity. This process, as applied to the isomerization of n-pentane, has been described in the patent to Starnes et al., U.S. 2,831,908.

Recently, it has been discovered that the isomerization of paraffins over platinum-type catalysts can be improved by the addition of small amounts of halogen to the reaction zone. This technique, as applied to paraffin hydroisomerization under the novel combination of conditions of U.S. 2,831,908, is described in the copending patent application of Starnes et al., Serial No. 706,233, filed December 31, 1957. In this procedure a paraffin fraction such as a fraction containing 85 percent n-pentane is contacted with a supported platinum-type catalyst such as a catalyst consisting essentially of a small amount of platinum deposited on an alumina support, possibly containing a small amount of chlorine, under isomerization conditions including a high liquid-hourly space velocity, i.e., greater than 5 volumes of hydrocarbon per volume of catalyst per hour, and low hydrogen concentration, i.e., less than one mol of hydrogen per mol of hydrocarbon. A halogen, preferably chlorine, is continuously added to the reaction zone, preferably by incorporating a halogen substituted hydrocarbon, such as t-butyl chloride, in the hydrocarbon feed stock in concentrations in the range of about 10 to 150 parts by weight of elemental halogen per million parts of hydrocarbon (hereinafter abbreviated as p.p.m.).

Although the addition of halogen to the hydroisomerization reaction zone markedly improves the isomerization activity of a supported platinum-type catalyst that contains little or no halogen initially, it has been discovered that the excessive addition of halogen has an adverse effect on the catalyst activity. This problem is recognized in the copending application of Kwolek et al., Serial No. 681,828, filed September 3, 1957, now U.S. 2,944,098, which discloses a procedure for restoring the activity of an "overchlorided" catalyst, that is to say, a catalyst which has lost activity as a result of excessive addition of halogen.

The present invention is based on the discovery of a method for controlling the addition of halogen to a hydroisomerization reaction zone whereby a sufficient concentration of halogen can be added to provide a high catalytic activity while avoiding excessive addition of halogen, or so-called overchloriding, and consequent catalyst deactivation. The process of the invention in general comprises contacting with a supported platinum-type isomerization catalyst a feed stream comprising a $C_4$ to $C_7$ aliphatic paraffin, hydrogen, and a volatile halogen-containing material selected from the group consisting of free halogens, hydrogen halides, and hydrocarbon halides under hydroisomerization conditions, measuring the halogen content of the hydroisomerization product, and reducing the halogen content of the feed stream when the halogen content of the hydroisomerization product exceeds a concentration corresponding to satisfactory rate of catalyst deactivation.

Our process is based on the discovery that when a supported platinum-type isomerization catalyst becomes "overchlorided" during paraffin isomerizataion while adding halogen to the feed, the halogen content of the liquid reactor product reaches a high level just before and during the period of rapid catalyst deactivation. In accordance with the invention we measure the halogen content of the liquid product and control the rate of halogen addition to the reaction zone in response to the measurements of product halogen concentration to maintain the latter concentration below the predetermined level that corresponds to "overchloriding" or rapid catalyst deactivation, or within the predetermined range that corresponds to satisfactory rate of catalyst deactivation.

A hydroisomerization process in which continuous halogen addition is most beneficial, but in which the avoidance of excessive halogen addition is most important, is the isomerization of a light paraffin such as n-pentane over an unpromoted platinum-alumina catalyst under reaction conditions including high space velocity and low hydrogen concentration. The principles of the invention can be illustrated by reference to this preferred modification wherein the invention has its greatest advantages. A hydrocarbon fraction containing at least 85 volume percent n-pentane and the rest essentially other open-chain paraffins is contacted with a fixed bed of pelleted platinum-alumina catalyst at a temperature in the range of 750 to 850° F., a pressure in the range of 400 to 600 p.s.i.g., a hydrogen concentration of about 0.5 mol per mol of hydrocarbon, and at a liquid-hourly spaced velocity of at least 8 vol./vol./hr. Halogen is continuously added to the reaction zone, for example, by incorporating t-butyl chloride with the hydrocarbon feed in a concentration in the range of 10 to 100 p.p.m. of elemental chlorine. The exact concentration of halogen is selected to produce an optimum isomerization activity, as shown by high yield of isopentane and high isomerization efficiency.

The reactor effluent is cooled at high pressure to condense hydrocarbons, and the hydrogen and light hydrocarbons are separated from the condensate. The latter product is then fractionated to separate butanes and lighter hydrocarbons. The debutanized or stabilized liquid product is continuously analyzed for halogen content. Under the reaction conditions employed in this preferred modification of the process, a concentration of about 1 to 14 p.p.m. of halogen in the liquid product corresponds to the normal and satisfactorily low rate of catalyst deactivation. However, a rise in the halogen content of the product above about 14 p.p.m. indicates that the catalyst will soon begin to deactivate rapidly, or that rapid deactivation has just begun, as a result of excessive halogen content of the feed. Accordingly, when the analysis indicates such excessive halogen content in the liquid product, the halogen content of the reactor charge is promptly reduced. For instance, if the feed initially contains a concentration of 50 p.p.m. of chlorine and the product chlorine level rises above the predetermined maximum, e.g., 14 p.p.m., the concentration in the feed is reduced, e.g., to 40 p.p.m. to maintain the chlorine content of the debutanized product below about 14 p.p.m.

Measurement of the halogen content of the liquid product can be accomplished by any of the known analytical procedures for measuring trace amounts of halogen in petroleum distillates. Continuous or intermittent analytical procedures can be used. Also, adjustment of the halogen content of the reactor feed in response to the halogen measurement of the product can be accomplished by automatic means or manually.

One suitable method for determining the halogen content of the product is a combustion-photometric procedure for determining chlorine within the concentration range of 2 to 100 p.p.m. in gasoline-range paraffin fractions. Briefly, the procedure is as follows: The hydrocarbon sample is burned in a wick lamp in an oxygen-carbon dioxide atmosphere according to a modification of the combustion phase of ASTM D 1266 test method. Modifications of the combustion phase to adapt it for chloride analysis include preburning the oxygen stream and scrubbing the preburned oxygen stream and the carbon dioxide stream with acidic silver nitrate solution to remove inorganic chlorides; and using water to absorb chlorides from the combustion product. The absorbed chlorides are then measured by photometric procedure instead of the volumetric procedure of D 1266. According to the photometric procedure, the dilute aqueous solution containing the absorbed chlorides is treated with ferric ammonium sulfate and mercuric thiocyanate to form the highly colored ferric thiocyanate complex. The complex is measured by means of a spectrophotometer capable of isolating a 5 millimicron spectral band in the region of 460 millimicrons and equipped with cuvettes having a 5 cm. light path. The photometric reading is converted to a concentration of chloride by means of a prepared calibration curve.

Another possible method for determining the halogen content of the hydroisomerization reactor product is described in the patent to Juterbock et al., U.S. 2,744,199. The Juterbock et al. method can be applied by metering a small amount of a radioactive halogen isotope at a given rate into the feed stock with the nonradioactive halogen. The quantity of radioactive material passing through the reactor and into the product in a given time can be determined by a radiation detector which can then automatically control the rate of halogen addition to the feed stock.

The process of the invention provides an improvement in the type of paraffin isomerization process in which halogen is introduced into the reaction zone in the form of a volatile halogen-containing material. This must be a material that vaporizes and yields free halogen or hydrogen halide under the reaction conditions. Some substances, for example, sulfur and nitrogen are harmful to the supported, platinum-type hydroisomerization catalysts. Therefore, halogen compounds containing these elements should not be used. The halogen-containing material should be selected from the group consisting of free halogens, hydrogen halides, and hydrocarbon halides that vaporize under the process conditions. Chlorine compounds are preferred, for example, hydrogen chloride or hydrocarbon chloride, preferably an alkyl chloride such as t-butyl chloride, propylene dichloride, etc. Although not necessarily equivalents, other halogens can also be used. Thus, alkyl bromides, fluorides, and iodides can be used in lieu of the chlorides.

A small concentration of halogen produces the desired result of promoting the isomerization activity of the platinum-type catalyst. For example, when chlorine is the added halogen an amount of the chlorine-containing material sufficient to provide about 10 to 50 parts by weight of elemental chlorine per million parts of hydrocarbon will normally be used. Under certain conditions a higher concentration can be used, but for any of the halogens a concentration greater than about 150 p.p.m. should not be used.

Our procedure for controlling halogen addition to a hydroisomerization reaction zone applies to a considerable range of paraffin feed stocks, platinum-type catalysts, and reaction conditions. Charge stocks include aliphatic paraffins of the $C_4$ to $C_7$ range. The charge stock can be a substantially pure fraction of n-butane, n-pentane, n-hexane, or n-heptane, or it can be a refinery fraction predominating in one of these straight-chain paraffins and containing minor amounts of other hydrocarbons of similar boiling points. It can also be a mixture of two or more of these straight-chain paraffins or fractions predominating therein. Most suitably, the charge stock is a refinery fraction that consists predominantly of one or more of the $C_4$ to $C_7$ straight-chain paraffins plus minor amounts of other hydrocarbons of similar boiling range that would normally be present in light, straight-run petroleum fractions or in natural gasoline fractions or in paraffin fractions recovered from conversion processes such as catalytic reforming.

In the isomerization process for which our novel method of control of halogen addition has its greatest advantages, i.e., isomerization at high space velocity, low hydrogen concentration, and moderate temperature over a supported platinum-type catalyst, the charge should be highly paraffinic. It should have no more than a negligible or low content of cyclics. A particularly suitable charge for this preferred modification of the process is a pentane fraction which contains 85 volume percent or more n-pentane and the rest consisting essentially of other open-chain paraffins. Another charge stock for the preferred modification of the process is a hexane fraction that contains at least 85 volume percent aliphatic hexanes. In this preferred modification of the process, the reactor feed should have the lowest cyclics content that is economically feasible considering the separation costs. In any event, in this preferred modification at least 90 percent of the hydrocarbon charge to the reactor should consist of aliphatic paraffins of no more than 7 carbon atoms per molecule.

The supported platinum-type catalysts used in the process are composed of a minor amount of a noble metal of the platinum group, i.e., palladium, rhodium, or the like, and a major amount of a support or carrier. The catalyst can be in the form of irregular granules or particles of uniform size and shape. The noble metal content is from 0.1 to 5.0 percent by weight and preferably is from 0.2 to 1.0 percent by weight. Catalytic alumina is a preferred support, but other known supports for platinum-type reforming and isomerization catalysts can be used. Other suitable supports include silica-stabilized alumina, silica-alumina composites, silica magnesia, bauxite, etc. The catalyst can contain a small amount, e.g., 0.2 to 0.6 weight percent chlorine. Such small amounts of chlorine are incorporated when the catalyst is prepared in the conventional way which involves precipitating the noble metal from the chlorine compound thereof. However, the technique of continuous addition of halogen to the hydroisomerization reaction feed is normally practiced with catalysts that do not contain a high concentration of halogen. Therefore, the fresh catalysts used in the process of the invention will normally contain less than one weight percent total halogen. Specific catalysts suitable for our process will be described in the working examples hereinafter.

In our novel procedure of control of halogen addition, control can be applied to paraffin isomerization over considerable ranges of reaction conditions. Ranges of reaction conditions for hydroisomerization include, for example, a temperature of 600° to 900° F., a pressure of 100 to 1,000 p.s.i.g., a liquid-hourly space velocity of 1 to 25 vol./vol./hr. or higher, and hydrogen concentrations ranging from the very low hydrogen concentrations disclosed in U.S. 2,831,908 to the higher hydrogen concentrations used in reforming processes.

Our procedure has its greatest advantages when operating under isomerization conditions conducive to high space-time-yield of isomer and high isomerization efficiency as disclosed in U.S. 2,831,908. These conditions include a low hydrogen concentration in the range corresponding to a mol fraction of hydrocarbon in the charge from about 0.5 to 0.9 or 0.95 and a high liquid-hourly space velocity of above 5 vol./vol./hr. and preferably above 8 vol./vol./hr. The pressure for this modification of the process is at least 375 p.s.i.g. and preferably is 400 to 600 p.s.i.g. The hydrogen concentration in the preferred modification of the process is less than one mol per mol of hydrocarbon or less than about 1,000 s.c.f. per barrel of hydrocarbon for the $C_4$ to $C_7$ aliphatic paraffin stocks. However, the hydrogen concentration must still be appreciable. There is a minimum hydrogen concentration below which good results are not obtained and below which the catalyst is rapidly deactivated by carbonaceous deposits. We use a hydrogen concentration above that at which rapid catalyst deactivation begins.

The following examples describe hydroisomerization runs that demonstrate the principles of the invention.

EXAMPLE 1

A pentane fraction was subjected to hydroisomerization in a long-cycle run under conditions conducive to high space-time-yield of isopentane. The catalyst was a fixed-bed, pelleted, platinum-alumina catalyst containing about 0.6 weight percent platinum, about 0.6 weight percent chlorine, and the rest essentially alumina. The hydrocarbon reactor charge was a pentane fraction consisting essentially of 89.7 volume percent n-pentane, 8.8 volume percent isopentane, 1.3 volume percent $C_6$ and heavier aliphatic hydrocarbons, and 0.2 volume percent $C_6$ cyclics. At the start of a phase of the run pertinent to the present invention, the catalyst had been on stream for hydroisomerizing the described pentane fraction for a catalyst age or throughput of about 13.7 barrels of hydrocarbon per pound of catalyst (bbl./lb.). During this phase the reaction conditions were: reaction temperature, 835° F.; pressure 500 p.s.i.g.; liquid-hourly space velocity, 9 vol./vol./hr.; hydrogen concentration corresponding to a mol fraction of hydrocarbon in the reactor feed of 0.75; and t-butyl chloride was added to the reactor feed in a concentration corresponding to 70 parts by weight of elemental chlorine per million parts of hydrocarbon. During this phase, which extended from about 13.7 to about 15 bbl./lb., the catalyst deactivated at a normal, low rate. More specifically, the catalyst activity decreased, in terms of isopentane content of the total pentane product, from about 57 to about 55 mol percent. Suddenly, however, at a catalyst age of about 15 bbl./lb., without any change in reaction conditions the catalyst began to deactivate rapidly. More specifically, in the period from about 15.0 to about 15.15 bbl./lb. the isopentane yield dropped from about 55 to about 50 mol percent. During the period of normal catalyst deactivation rate prior to 15 bbl./lb. and the rapid deactivation period thereafter, samples of the stabilized liquid product were analyzed for chlorine content. During the period of normally slow deactivation the product contained from about 1 to about 14 parts per million of chlorine, but during the period of rapid deactivation the product contained from 20 to 27 parts per million of chlorine.

The table below records reaction conditions and results for the above example and for two other examples of hydroisomerization runs which demonstrate the principles of the invention. In Example 2 the catalyst (designated as catalyst B, in contrast to catalyst A employed in Example 1) was in the form of irregular granules and consisted essentially of 0.78 weight percent platinum, 0.25 weight percent silica, 0.3 weight percent chlorine, and the rest alumina. The charge stock was the same straight-run pentane fraction as described in Example 1. In Example 3 the catalyst was the same as in Example 2, but the charge stock was a pentane fraction of a reformed gasoline product. The hydrocarbon feed for Example 3 contained 89.9 volume percent n-pentane, 5.4 volume percent isopentane, 4.2 volume percent $C_6$ and heavier aliphatic hydrocarbons, and 0.5 volume percent cyclics. The table records the catalyst age at which rapid deactivation by "overchloriding" began.

*Table*

| Example | 1 | 2 | 3 |
| --- | --- | --- | --- |
| Catalyst | A | B | B |
| Charge Stock | Straight Run Pentane Fraction | Straight Run Pentane Fraction | Reformate Pentane Fraction |
| Reactor Conditions: | | | |
| Temperature, °F | 835 | 840 | 800 |
| Space Velocity, Vol./Vol./Hr | 9 | 9 | 9 |
| Mol Fraction Hydrocarbon $N_{HC}$ | 0.75 | 0.75 | 0.75 |
| Pressure, p.s.i.g. | 500 | 500 | 500 |
| Chlorine (as t-Butyl Chloride) added to Liquid Feed, p.p.m. | 70 | 50 | 60 |
| Catalyst Age, Bbl./Lb. | 15 | 22 | 26 |
| Isopentane in Reactor Liquid Product: Mol percent of Total Pentane (Normal Conversion) | 56 | 55 | 53 |
| Chloride in Reactor Liquid Product During Normal and Rapid Periods of Catalyst Deactivation, p.p.m.: | | | |
| Normal Deactivation | 1–14 | 4–12 | 2–11 |
| Rapid Deactivation | 20–27 | 18–22 | 13–18 |

The above table shows that when halogen is introduced with the hydroisomerization feed, the halogen content of the liquid product is an indication of the catalyst deactivation rate. Thus, the normal, low rate of catalyst deactivation is associated with a low halogen concentration in the liquid product, but rapid deactivation resulting from excessive halogen addition is associated with a substantially higher halogen concentration in the product. The table shows that the maximum halogen content of the liquid product that corresponds to satisfactory operation will differ somewhat for different catalysts, charge stocks, and reaction conditions. It shows, however, that hydroisomerization of n-pentane over a platinum-alumina catalyst under conditions conducive to high space-time-yield of isopentane, i.e., low hydrogen concentration and high space velocity, proceeds at a normal, low catalyst deactivation rate when the reactor product contains no more than about 11 to about 14 parts per million of chlorine.

In hydroisomerization operations other than the preferred modification of the invention exemplified by Examples 1–3, the maximum permissible halogen content for satisfactory catalyst life can vary even more than the maximum level demonstrated in the examples, depending upon the catalysts, charge stocks, reaction conditions, and the particular halogen employed. However, for any given combination of such variables the maximum permissible halogen content of the product can readily be determined by a series of pilot runs. When the maximum halogen content is thus determined for the given operation this information can be employed for control of the halogen addition rate in commercial operation of the process.

The extent to which the halogen content of the feed must be reduced when the analysis of the product indicates that its halogen content is near the maximum level for the normal, low, catalyst deactivation rate will also depend somewhat on the circumstances of the particular run. For instance, when operating at a chlorine addition rate of 50 p.p.m., if the product analysis shows that the chloride content is near the upper limit for satisfactory operation, it may be possible to avoid the danger of "overchloriding" by reducing the addition rate to 40 p.p.m. Depending upon the extent to which "overchloriding" may have already developed and also upon the level of chlorine addition, the reduction of halogen content of the feed may have to be more drastic than merely a drop of 10 p.p.m., such as from 50 to 40 p.p.m. However, as in the determination of the proper halogen content of the product by routine testing, the necessary decrease of halogen content of the feed can be determined for any combination of reaction conditions by routine testing.

Obviously many modifications and variations of the invention as hereinbefore set forth may be made without departing from the spirit and scope thereof, and therefore only such limitations should be imposed as are indicated in the appneded claims.

We claim:

1. In a process comprising contacting in a hydroisomerization zone under hydroisomerization conditions a supported platinum-type hydroisomerization catalyst, a hydrocarbon comprising an aliphatic paraffin containing not more than 7 carbon atoms per molecule, hydrogen, and a halogen material volatile under hydroisomerization conditions selected from the group consisting of free halogen, hydrogen halide and alkyl halide, and recovering a reaction effluent which can be fractionated into a stabilized liquid fraction substantially all of whose hydrocarbons contain more than 4 carbon atoms per molecule which also contains halogen and into another fraction lighter than said stabilized liquid, the improvement which comprises fractionating said reaction effluent to separate the stabilized liquid substantially all of whose hydrocarbons contain more than 4 carbon atoms per molecule which also contains halogen from the fraction lighter than said stabilized liquid, measuring the halogen concentration in said stabilized liquid fraction, a first concentration range of halogen in said stabilized liquid fraction corresponding to both high activity of said catalyst and a low rate of deactivation of said catalyst, an increase in concentration of halogen in said stabilized liquid fraction from said first range to a second concentration higher than said first concentration range indicating rapid catalyst deactivation, adjusting the amount of said halogen material charged to said hydroisomerization zone in response to a change in halogen concentration in said stabilized liquid fraction, said adjustment maintaining the concentration of halogen in said stabilized liquid product within said first range, and said adjustment being sufficiently prompt upon an increase in halogen concentration in said stabilized liquid product above said first concentration range to substantially avoid rapid catalyst deactivation.

2. In a process comprising contacting in a hydroisomerization zone under hydroisomerization conditions a platinum-alumina hydroisomerization catalyst, a hydrocarbon comprising an aliphatic paraffin containing not more than 7 carbon atoms per molecule, hydrogen, and an alkyl halide volatile under hydroisomerization conditions, and recovering a reaction effluent which can be fractionated into a stabilized liquid fraction substantially all of whose hydrocarbons contain more than 4 carbon atoms per molecule which also contains halogen and into another fraction lighter than said stabilized liquid, the improvement which comprises fractionating said reaction effluent to separate the stabilized liquid substantially all of whose hydrocarbons contain more than 4 carbon atoms per molecule which also contains halogen from the fraction lighter than said stabilized liquid, measuring the halogen concentration in said stabilized liquid fraction, a first concentration range of halogen in said stabilized liquid fraction corresponding to both high activity of said catalyst and a low rate of deactivation of said catalyst, an increase in concentration of halogen in said stabilized liquid fraction from said first range to a second concentration higher than said first concentration range indicating rapid catalyst deactivation, adjusting the amount of said alkyl halide charged to said hydroisomerization zone in response to a change in halogen concentration in said stabilized liquid fraction, said adjustment maintaining the concentration of halogen in said stabilized liquid product within said first range, and said adjustment being sufficiently prompt upon an increase in halogen concentration in said stabilized liquid product above said first concentration range to substantially avoid rapid catalyst deactivation.

3. Claim 2 wherein said alkyl halide is an alkyl chloride.

4. Claim 2 wherein said alkyl halide is t-butyl chloride.

5. In a process comprising contacting in a hydroisomerization zone under hydroisomerization conditions, a platinum-alumina hydroisomerization catalyst, a hydrocarbon comprising essentially a pentane fraction, hydrogen, and an alkyl chloride volatile under hydroisomerization conditions, about 10 to 150 parts by weight of chlorine being present per million parts of hydrocarbon, and recovering a reaction effluent which can be fractionated into a stabilized liquid fraction substantially all of whose hydrocarbons contain more than 4 carbon atoms per molecule which also contains chlorine and into another fraction lighter than said stabilized liquid, the improvement which comprises fractionating said reaction effluent to separate the stabilized liquid substantially all of whose hydrocarbons contain more than 4 carbon atoms per molecule which also contains chlorine from the fraction lighter than said stabilized liquid, measuring the chlorine concentration in said stabilized liquid fraction, the concentration range of chlorine in said stabilized liquid fraction of about 1 to 14 parts by weight of chlorine per million parts of hydrocarbon corresponding to both activity of said catalyst and a low rate of deactivation of said catalyst, an increase in concentration of chlorine in said stabilized liquid fraction from said concentration range to a concentration above said concentration range indicating rapid catalyst deactivation, adjusting the amount of said alkyl chlorine charged to said hydroisomerization zone in response to a change in chlorine concentration in said stabilized liquid fraction, said adjustment maintaining the concentration of chlorine in said stabilized liquid product within said range, and said adjustment being sufficiently prompt upon an increase in chlorine concentration in said stabilized liquid product above said concentration range to substantially avoid rapid catalyst deactivation.

References Cited in the file of this patent
UNITED STATES PATENTS

| | | |
|---|---|---|
| 2,462,946 | Coggeshall et al. | Mar. 1, 1949 |
| 2,798,105 | Heinemann et al. | July 2, 1957 |
| 2,944,097 | Starnes et al. | July 5, 1960 |
| 2,944,098 | Fogle et al. | July 5, 1960 |
| 2,980,605 | Lifland et al. | Apr. 18, 1961 |

UNITED STATES PATENT OFFICE
CERTIFICATE OF CORRECTION

Patent No. 3,105,859                                      October 1, 1963

Merald C. Fogle et al.

It is hereby certified that error appears in the above numbered patent requiring correction and that the said Letters Patent should read as corrected below.

Column 8, line 45, after "both" insert -- high --; line 50, for "chlorine" read -- chloride --.

Signed and sealed this 31st day of March 1964.

(SEAL)
Attest:
ERNEST W. SWIDER

Attesting Officer

EDWARD J. BRENNER

Commissioner of Patents